United States Patent [19]

Morioka

[11] Patent Number: 4,523,727
[45] Date of Patent: Jun. 18, 1985

[54] NON-OSCILLATING SPOOL FOR BELT DRIVEN CARTRIDGE

[75] Inventor: Eddie T. Morioka, Roseville, Minn.

[73] Assignee: Minnesota Mining and Manufacturing Company, St. Paul, Minn.

[21] Appl. No.: 626,136

[22] Filed: Jun. 29, 1984

[51] Int. Cl.³ .................... G03B 1/04; G11B 15/32
[52] U.S. Cl. .................. 242/192; 242/71.8; 242/199
[58] Field of Search .......... 242/71.8, 76, 192, 197–200; 360/93, 96, 132; 352/72, 78 R

[56] References Cited

U.S. PATENT DOCUMENTS

| | | | |
|---|---|---|---|
| 3,692,255 | 9/1972 | Von Behren | 242/192 |
| 4,289,282 | 9/1981 | Kohno | 242/71.8 |
| 4,352,469 | 10/1982 | Huck | 242/71.8 |
| 4,457,473 | 7/1984 | Mroz et al. | 242/192 |
| 4,473,194 | 9/1984 | Kashimura | 242/71.8 |

FOREIGN PATENT DOCUMENTS

| | | |
|---|---|---|
| 82107172.7 | 8/1982 | European Pat. Off. . |
| 3222632 | 1/1983 | Fed. Rep. of Germany . |
| 52-110603 | 8/1977 | Japan . |
| 52-140451 | 10/1977 | Japan . |
| 5255959 | 4/1979 | Japan . |

OTHER PUBLICATIONS

U.S. Ser. No. 626,138 patent appln. filed 6/29/84—'-Anti-Friction and Non-Oscillating Spool for Belt Driven Cartridge", copending and commonly-assigned.

Primary Examiner—Leonard D. Christian
Attorney, Agent, or Firm—Donald M. Sell; James A. Smith; David W. Anderson

[57] ABSTRACT

A tape spool adapted for mounting on and rotation relative to a cylindrical pin extending perpendicularly from a first wall toward a parallel second wall defining an enclosure and adapted to engage both of the walls and resist movement toward either, including a first flange adjacent the first wall, a second flange adjacent the second wall, a hub interconnecting the flanges and providing a cylindrical winding surface, a bore through the first flange and into the hub which closely but freely surrounds the pin, a tubular collar interposed between the first wall and the first flange to support the first flange out of contact with the first wall, which collar has an inner diameter allowing free passage of the pin and a thin wall to reduce the area of contact between the collar and the first wall. A wear-button protrusion extends beyond the second flange coaxial with the hub bore to contact the second wall, and a spring is interposed between the spool and the protrusion for biasing the protrusion toward the second wall and the spool toward the first wall so that axial movement of the spool relative to the pin is resisted.

7 Claims, 2 Drawing Figures

NON-OSCILLATING SPOOL FOR BELT DRIVEN CARTRIDGE

BACKGROUND OF THE INVENTION

1. Field of the Invention

The present invention concerns an improved spool for a two-spool tape cartridge in which a flexible, elastic drive belt contacts the tape on the tape spools and whereby movement of the belt causes movement of the tape between the spools.

2. Description of the Prior Art

The belt driven tape cartridge of U.S. Pat. No. 3,692,255, issued to Von Behren and assigned to the assignee of the present invention, has been very successfully utilized to interface with computers where rapid acceleration and deceleration of the tape are required. In the cartridge there disclosed, a magnetic recording tape is convolutely wound on two tape spools and is bidirectionally driven between the spools by an endless flexible belt in frictional contact with the tape on both spools.

When the cartridge of the Von Behren patent was first marketed in 1972, its magnetic recording tape had a width of ¼ inch (6.35 mm), a thickness of 1 mil (0.025 mm), and was driven at 30 inches (762 mm) per second. Data were originally recorded on the tape at a density of 1600 flux reversals per inch (63 per mm). Current cartridges come in a variety of sizes and the recording tapes range in width from 0.150 inches (3.81 mm) to 0.250 inches (6.35 mm), may be as thin as 0.6 mil (0.015 mm), may be driven at 90 or more inches (2286 mm) per second, and data is recorded at densities of 10,000 flux reversals per inch (394 per mm) or more. In addition, data are recorded on a plurality of independent, parallel tracks, which may number in excess of 32, spaced across the width of the magnetic recording tape.

Although no problems were encountered when the cartridge was first introduced, the higher tape speeds, recording densities, and track densities have created a need for improved spool positioning during winding and unwinding of the magnetic tape.

SUMMARY OF THE INVENTION

The present invention discloses a tape spool for use in a data cartridge which includes means for retaining the spool at a predetermined axial position with respect to the cartridge.

Particularly, the tape spool is adapted for mounting on and rotation relative to a cylindrical pin extending perpendicularly from a first wall toward a parallel second wall defining a cartridge and is adapted to resiliently engage both of the walls and resist movement toward either. The spool includes a first flange adjacent the first wall, a second flange adjacent the second wall, a hub interconnecting the flanges and providing a cylindrical winding surface, a bore through the first flange and into the hub which closely but freely surrounds the pin, a tubular collar interposed between the first wall and the first flange to support the first flange out of contact with the first wall, which collar has an inner diameter allowing free passage of the pin and a thin wall to reduce the area of contact between the collar and the first wall, a wear-button protrusion extending beyond the second flange coaxial with the hub bore to contact the second wall, and a spring interposed between the spool and the wear-button protrusion for biasing the protrusion toward the second wall and said spool toward the first wall so that axial movement of the spool is resisted.

BRIEF DESCRIPTION OF THE DRAWINGS

The present invention will be more thoroughly described with reference to the accompanying drawings, wherein like numbers refer to like parts in the several views, and wherein.

DESCRIPTION OF THE PREFERRED EMBODIMENTS

Figure 1:
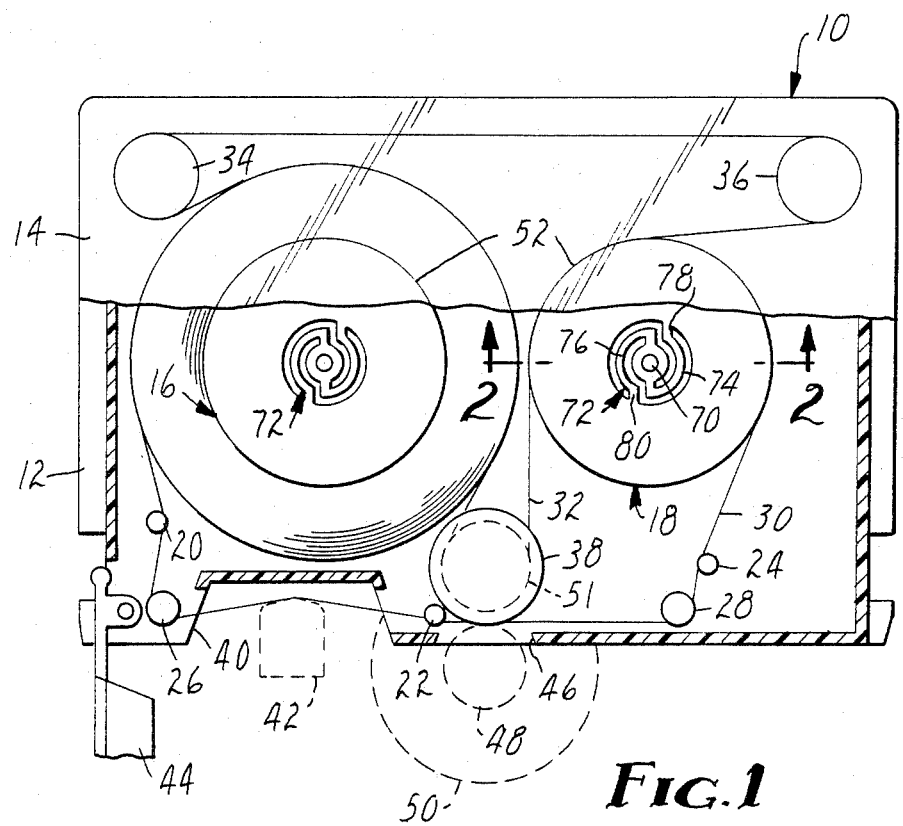
FIG. 1 is a top plan view of a belt driven tape cartridge, partially in section, containing an improved tape spool of the present invention.

FIG. 1 illustrate a data cartridge 10 of the type described in U.S. Pat. No. 3,692,255 (Von Behren) which includes a thin base plate 12, usually of aluminum, and a clear or translucent polymeric cover 14, which, when assembled, define a thin, generally rectangular enclosure. Enclosed within the data cartridge 10 are a pair of tape spools 16 and 18, three tape wrap pins 20, 22 and 24, a pair of tape guides 26 and 28, a length of magnetic recording tape 30, a driving belt 32, a pair of belt guide rollers 34 and 36, and a belt driving roller 38.

The tape spools 16 and 18 are supported by the cartridge base plate 12 for free rotation about spaced parallel axes. The magnetic recording tape 30 is convolutely wound on the tape spools 16 and 18 in opposite directions about their axes. The tape 30 guide path between the tape spools 16 and 18 is defined by the three tape wrap pins 20, 22 and 24 and the two tape guides 26 and 28.

The cartridge 10 is formed with a cutaway portion 40 along the tape path which provides access to the magnetic tape 30 by a magnetic transducer 42. The cutaway portion 40 is normally closed by a spring-loaded door 44 which is opened as shown upon insertion of the data cartridge 10 into a tape recorder (not shown). A second opening 46 is provided in the cartridge cover 14 to provide access to the belt driving roller 38 by a drive roller 48 driven by a reversible motor 50. The magnetic transducer 42, the drive roller 48, and the reversible motor 50 are illustrated in phantom lines as they form a portion of the tape recorder rather than the data cartridge 10.

The cartridge belt driving roller 38 is provided with a reduced diameter 51 to prevent contact between the driving belt 32 and the magnetic recording tape 30. The driving belt 32 is thin, continuous, flexible and elastic. It has a uniform cross-sectional area and it extends around the belt driving roller 38 and the belt guide rollers 34 and 36, contacting the tape 30 on the tape spools 16 and 18.

The length of the belt 32 is less than the length of the path along which it extends so that when the belt 32 is stretched into position it will have an installed tension or pretension. The angle of wrap of the driving belt 32 at the tape spools 16 and 18 is at least 60 degrees and provides the necessary contact between the belt 32 and the tape 30 wound on the tape spools 16 and 18 to assure frictional driving of the tape 30 and the tape spools 16 and 18.

Rotation of the belt driving roller 38 in a counterclockwise direction (as viewed in FIG. 1) by the drive roller 48 causes the belt 32 to traversed its path in a counterclockwise direction and the tape 30 to move from the tape spool 18 to the tape spool 16, the tape spool 18 serving as a supply spool and the tape spool 16 serving as a take-up spool. Opposite rotation of the driving roller 38 by the drive roller 48 will cause tape to be supplied by the tape spool 16 and convolutely wound upon the tape spool 18. A predetermined frictional coupling between the belt guide rollers 34 and 36 and their respective support shafts applies a predetermined drag to the belt 32 as it passes around the guide rollers 34 and 36, thereby increasing the tension of the belt 32 as it passes around each of the belt guide rollers 34 and 36. This increased tension in the belt 32 increases the length of the belt 32 according to its elasticity and thereby the speed at which the belt 32 passes around the spool 18 is increased compared to that at which it passes around the spool 16. This increased speed causes tension in the tape 30 as well as the ability to take up any slack developed in the tape 30 between the tape spools 16 and 18 as is more fully taught in U.S. Pat. No. 3,692,255.

Figure 2:
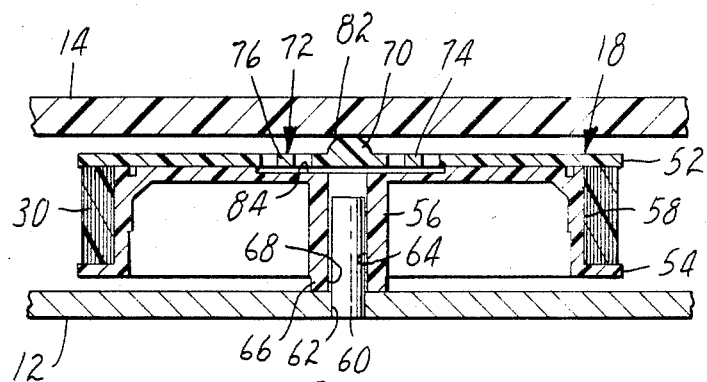
FIG. 2 is a cross-sectional view of the tape spool of the present invention taken generally along the line 2—2 of FIG. 1.

The improved tape spool 16 or 18 of the present invention is best illustrated in FIG. 2 and includes an upper flange 52 and a lower flange 54 interconnected by a hub 56 providing a cylindrical tape winding surface 58. The spool 16 or 18 is preferably molded of plastic with the hub 56 and lower flange 54 molded as a single unit and the upper flange 52 molded separately and attached to the hub 56 either by an adhesive or welding. The spool 16 or 18 is mounted to the cartridge 10 on and for rotation around a pin 60 which is press fitted into a hole 62 in the cartridge plate 12 to extend a predetermined distance above the plate 12. The spool 16 or 18 is journaled for free rotation around the pin 60 by means of a bore 64 provided in the hub 56, which bore 64 is sized to closely but freely fit the diameter of the pin 60.

To reduce rotational friction between the lower flange 54 and the cartridge plate 12, the lower flange 54 is provided with a collar 66 which is interposed between the lower flange 54 and the cartridge plate 12. The collar 66 may be molded as an integral portion of the hub 56 and the lower flange 54 or may be a separate cylindrical piece inserted over the pin 60 prior to assembly of the spool 16 or 18 to the pin 60. If the collar 66 is included as a separate piece, it may be advantageously manufactured of a low frictional material such as polytetrafluoroethylene. The cylindrical collar 66 has an inner bore 68 which freely allows passage of the pin 60 and has a thin wall to reduce the area of contact between the collar 66 and the cartridge plate 12. Although the collar 66 is shown as having a diameter reduced from that of the circumference of the spool 16 or 18, it should be recognized that the collar 66, particularly if molded as a portion of the lower flange 54, may have any diameter up to the circumference of the lower flange 54. A larger diameter collar 66 may increase the stability of the spool 16 or 18 although an increase in friction must be accepted because of the larger area of contact between the collar 66 and the cartridge plate 12. If the diameter of the collar 66 is enlarged, it would still be desirable to maintain the collar 66 as a thin-walled cylinder in order to minimize this increase in contact area.

The speed at which the spool 16 or 18 rotates, or inversion of the cartridge 10 in use, may cause the spool 16 or 18 to lift from the cartridge base plate 12 and oscillate with respect to the pin 10. This oscillation will result in imperfect convolute winding of the tape 30 upon the spool 16 or 18 and may cause the edges of the tape 30 to be damaged by contact with the flanges 52 or 54.

To prevent this detrimental oscillation, the spool 16 or 18 is provided with a wear-button protrusion 70 which projects above the surface of the upper flange 52 opposite and coaxial to the hub bore 64 to contact the cartridge cover 14 and force the spool 16 or 18 into contact with the cartridge plate 12. Although the wear-button protrusion 70 could be molded as an integral portion of a solid upper flange 52, such a construction would require that tolerances be closely maintained to prevent either loss of contact with the cartridge cover 14 or excessive pressure between the spool 16 or 18 and the cartridge plate 12 and cover 14.

To provide for the resilient compensation of tolerance variations in the collar 66 and the hub 56, the wear-button protrusion 70 is provided with a spring 72 between the upper flange 52 and the wear-button protrusion 70. The spring 72 is best illustrated in FIG. 1 and preferably includes double-cantilever spring arms 74 and 76 which connect between the wear-button protrusion 70 and diametrically opposed areas 78 and 80 of the upper flange 52. The spring arms 74 and 76 are also preferably formed in a flat helix which increases the length of each arm 74 and 76 and thus the resilient travel of the spring 72. Also preferably, the wear-button protrusion 70, the spring 72, including both spring arms 74 and 76, and the upper flange 52 are molded as a single piece to eliminate assembly costs. It should be recognized, however, that the wear-button protrusion 70 and the spring 72 could be manufactured as a single piece and assembled to the upper flange 52 as by an adhesive or welding. Such a construction may be preferable in that the wear-button protrusion 70 could be then manufactured from a highly abrasion-resistant polymer such as acetal resin or polycarbonate while the upper flange 52 is manufactured of a softer but more economical material such as acrylonitrile-butadiene-styrene copolymer or high-impact polystyrene. Also it should be recognized that the spring 72 need not assume the particular configuration considered as preferable. The spring could simply be one or two cantilever springs which connect the wear-button protrusion 70 and the upper hub 52.

Returning to FIG. 2, the wear-button protrusion 70 preferably assumes a frusto-conical or hemispherical shape and includes a rounded upper surface 82 which reduces the area of contact between the wear-button protuberance 70 and the cartridge cover 14. FIG. 2 also illustrates that the spool hub 56 is provided with a recess 84 in the area of the spring 72 to permit the resilient deformation of the spring 72 and that the pin 60 stops short of contact with the wear-button protrusion 70, also to permit this resilient deflection.

Although the present invention has been described with respect to only a single embodiment it is recognized that modifications will be apparent to those skilled in the art. All of such modifications which fall within the spirit and scope of the appended claims are intended to be included in the present invention.

I claim:

1. A tape spool adapted for mounting on and rotation relative to a cylindrical pin extending perpendicular from a first wall toward a second parallel wall defining an enclosure and adapted to engage both of said walls and resist movement toward either, comprising:

a first flange adjacent said first wall;

a second flange adjacent said second wall;
a hub interconnecting said flanges and providing a cylindrical winding surface;
a bore through said first flange and into said hub which closely but freely surrounds said pin;
a tubular collar interposed between said first wall and said first flange to support said first flange out of contact with said first wall, which collar has an inner diameter allowing free passage of said pin and a thin wall to reduce the area of contact between said collar and said first wall;
a wear-button protrusion extending beyond said second flange coaxial with said hub bore to contact said second wall; and
means interposed between said spool and said wear-button protrusion for biasing said protrusion toward said second wall and said spool toward said first wall so that axial movement of said spool is resisted.

2. A tape spool according to claim 1 wherein said means for biasing is a cantilever spring connecting said second flange and said wear-button protrusion.

3. A tape spool according to claim 2 wherein said second flange, said cantilever spring and said wear-button protrusion are portions of a single molded piece.

4. A tape spool according to claim 2 wherein said wear-button protrusion is frusto-conical and includes a rounded surface adjacent said second wall.

5. A tape spool according to claim 2 wherein said spring is a double-cantilever spring connected between said wear-button protrusion and diametrically opposed areas of said second flange.

6. A tape spool according to claim 5 wherein said spring is a flat helix between said wear-button protrusion and said second flange to increase the length of said spring and thereby its resiliency.

7. A tape spool according to claim 6 wherein said second flange, said spring and said wear-button protrusion are portions of a single molded piece.

* * * * *